United States Patent [19]
Kvalheim et al.

[11] 3,875,897
[45] Apr. 8, 1975

[54] LUMBER AND VENEER JOINTER AND COATER

[76] Inventors: Andrew M. Kvalheim, 823-825 Petaluma Blvd. South, Petaluma, Calif. 94952; Bob L. McEvers, 7300 S.W. Child Rd., P.O. Box 288, Tualatin, Oreg. 97062

[22] Filed: Aug. 17, 1970

[21] Appl. No.: 64,385

Related U.S. Application Data

[62] Division of Ser. No. 731,525, May 23, 1968, Pat. No. 3,580,792.

[52] U.S. Cl. ................. 118/228; 118/35; 118/262
[51] Int. Cl. ............................................. B05c 1/02
[58] Field of Search .......... 118/227, 228, 244, 262, 118/35

[56] References Cited
UNITED STATES PATENTS

| | | | |
|---|---|---|---|
| 2,157,724 | 5/1939 | Zablocki | 118/228 X |
| 2,682,254 | 6/1954 | Nicholson | 118/244 |
| 2,989,940 | 6/1961 | Williams | 118/262 X |
| 3,286,687 | 11/1966 | Miner et al. | 118/262 X |
| 3,303,815 | 2/1967 | Silver | 118/262 |
| 3,358,645 | 12/1967 | Caulford et al. | 118/262 |

*Primary Examiner*—John P. McIntosh
*Attorney, Agent, or Firm*—Misegades, Douglas & Levy

[57] ABSTRACT

A machine for jointing lumber on both longitudinal edges, simultaneously, by squaring said edges, and by applying glue, if desired, so that the finished lumber piece is ready for joining with other like pieces to form a panel. Either veneer or lumber strips may be prepared by the machine. The machine comprises a tubular frame assembly, an endless chain conveyor assembly for passing lumber to be treated through the machine, series of top and bottom hold-down rollers for guiding the lumber through the machine, and a pair of cutter assemblies for simultaneously finishing the longitudinal edges, each said cutter assembly being incrementally movable inwardly and outwardly with respect to the long axis of the machine by means of a positioning set works assembly, remotely controlled. The machine also includes a pair of glue applicators for applying glue to the finished lumber edges, and a top, hold-down roller assembly, each hold-down roller being individually actuable to a hold-down position, or, alternatively, the entire bank of rollers may be simultaneously actuable to a hold-down position. A vertical adjustment assembly is provided for setting each roller in a pre-determined hold-down position; the adjustment mechanism sets all top rollers simultaneously.

1 Claim, 16 Drawing Figures

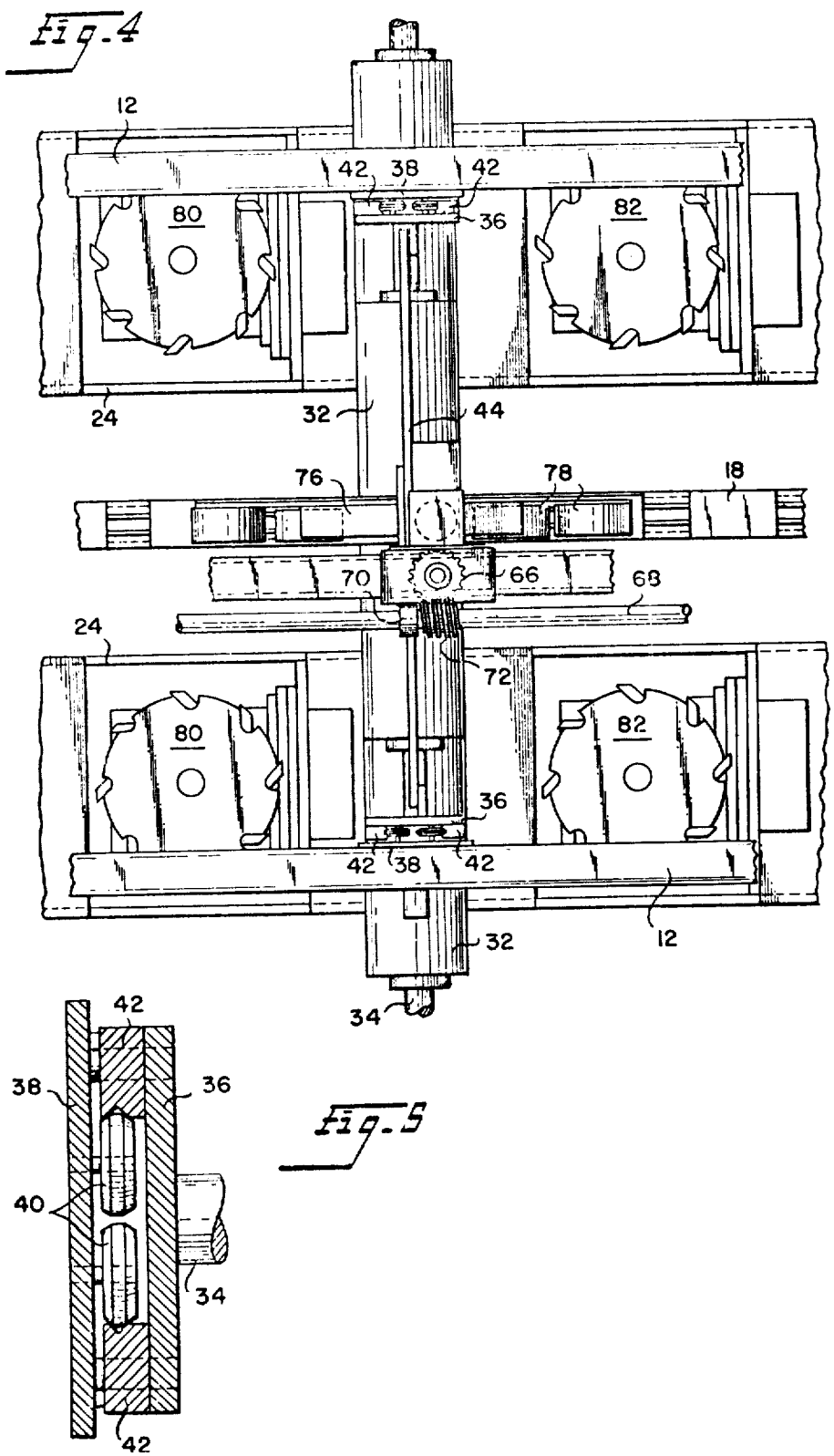

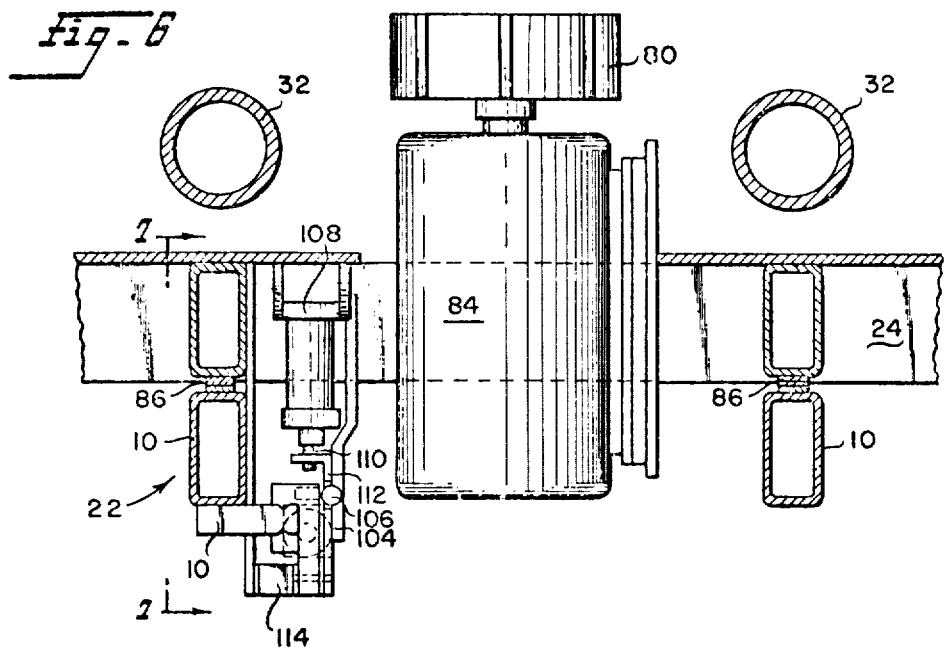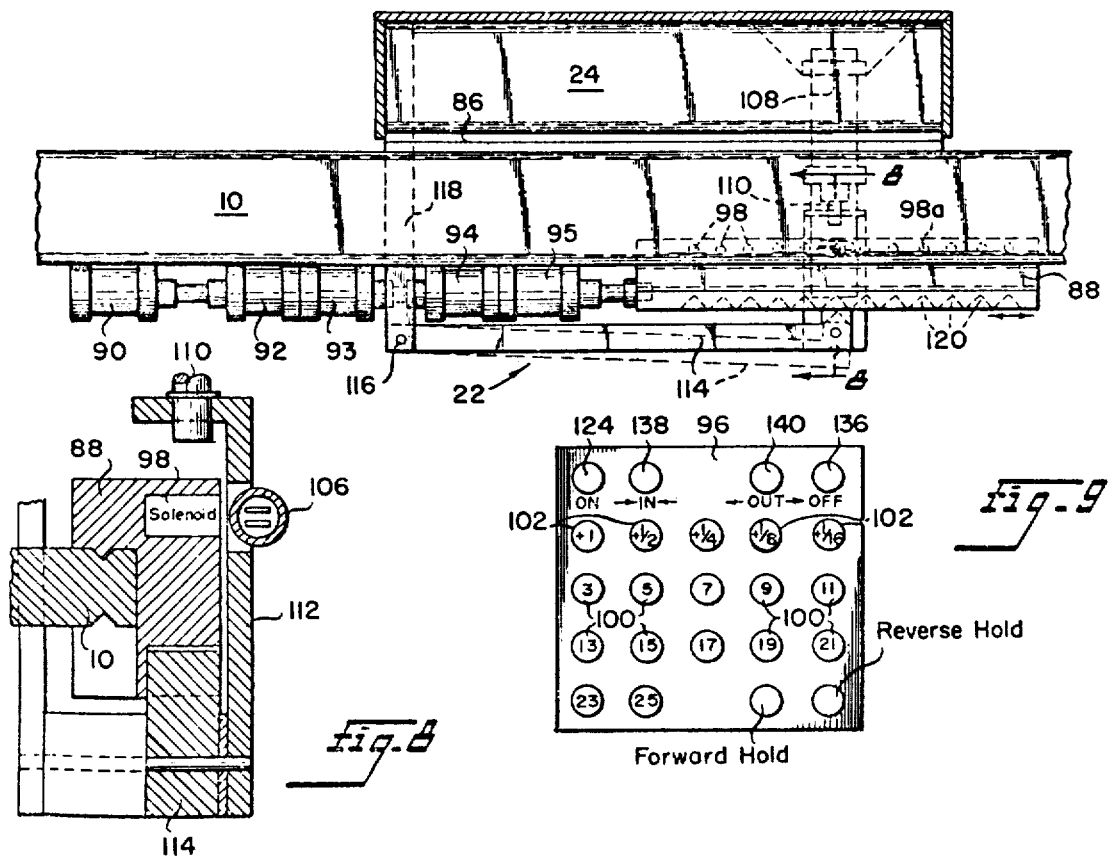

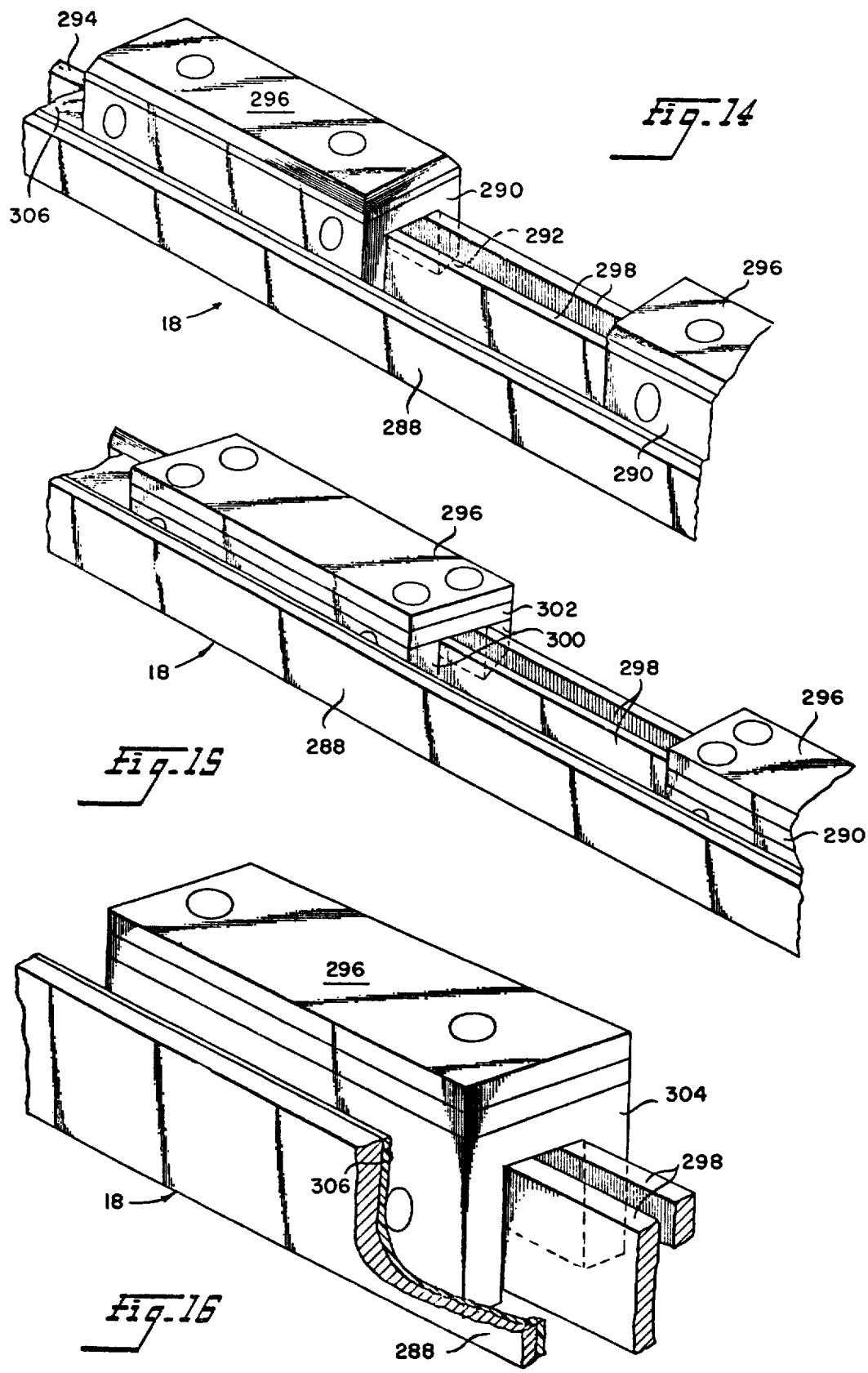

LUMBER AND VENEER JOINTER AND COATER

CROSS-REFERENCE TO RELATED APPLICATION

This is a divisional application of U.S. application Ser. No. 731,525, filed May 23, 1968, now U.S. Pat. No. 3,580,792.

BACKGROUND OF THE INVENTION

The invention relates generally to machines for preparing lumber and veneer strips to be joined together to form larger lumber or veneer panels after processing by the instant invention. In preparing such strips, it is essential that the longitudinal side edges of the strip be absolutely straight and square. It is further desirable that a layer of glue be applied to each longitudinal edge of the strip so that it is fully prepared for mating with additional strips to form the final panel. Stated generally, such machines are old in the art but such prior art machinery lacks the precise accuracy and ease of operation of the instant invention. Commonly, the prior art devices include a frame assembly, a series of rollers for guiding the wood strip through the machine, a conveyor chain assembly, for transporting the strip to be treated through the machine, and some sort of cutter means for dressing the longitudinal side edges of the lumber or veneer strip. In the art of adjustable gauging devices for saw machinery, prior art devices include remote controlled means for incrementally setting a cutter in a desired station, but such fractional gauging devices lack the absolute accuracy that is provided by the instant invention.

Several patents accurately reflect the state of the prior art. U.S. Pat. No. 698,111 issued to H. A. Gale discloses a lumber edging machine including a pair of oppositely travelling conveyor belts for passing the lumber through one side of the machine where a pair of fixed, rotating saws edge and groove one longitudinal edge of the lumber, whereupon the lumber is withdrawn and reinserted into the other side of the machine to edge and groove the opposite longitudinal edge. Obviously, such two-stage treatment rather than simultaneous treatment is slower and more expensive. A top hold down roller assembly is provided to guide the lumber through the machine, but each roller is retained against the lumber only by weight and spring pressure, and the compression force of each spring for each roller is individually adjustable, rather than simultaneously adjustable. Finally, no provision is made to cut the lumber strip to an exact width.

U.S. Pat. No. 1,805,906 issued to A. A. Dennis discloses a veneer stack jointer including a cam operated, manual hold-down assembly, each roller being equipped with a compression spring to force the roller against the veneer stack. A hog saw is provided to treat the longitudinal edge of the stack, but again the stack must be twice inserted through the machine in order to edge both sides. A guage table is provided to measure the width of the stack, but no means is provided to assure a uniform flat width throughout the entire length of the veneer stack.

A significant advance in the art is indicated by U.S. Pat. No. 2,664,927 issued to A. F. Pierce. The invention disclosed includes a panel trim machine including two pairs of saws for treating the longitudinal side edges of a panel, denoted as 30 and 36 respectively. FIGS. 3, 5, 6 and 7 indicate a simple screw thread and rotatable handle assembly for adjusting the distance between each pair of edge treating saws. However, absolute precise spacing of the saws is not possible with such a mechanism, and no means is provided to lock such saws into place. At any rate, the machine presents the significant advantage of treating parallel longitudinal side edges of a panel simultaneously. The panel is guided through the machine by upper and lower endless conveyor belts comprising endless chains having panel-contacting blocks with tapered side edges mating with a tapered guide block as shown in FIG. 8. Such construction insures straight line movement of the panel through the machine, but the present invention requires only a single conveyor belt, and construction is simplified, in that each panel contacting block is an integral member of the conveyor chain. The Pierce patent additionally provides a series of top and bottom hold down rollers without any incremental adjustment assembly for such rollers.

An indexing assembly for determining the width of a piece of lumber to be sawed is indicated in U.S. Pat. No. 2,714,906 issued to G. J. Peterson which discloses a complex cylinder and piston electrically controlled indexing assembly. The instant invention provides a simpler and more easily operated indexing assembly and additionally provides positive locking means for setting the trim cutter so as to insure an exact width to the lumber to be cut. A later development in the art of indexing assemblies is indicated by U.S. Pat. No. 2,999,518 issues to O. E. Mowery et al which illustrates an indexing assembly including a plurality of limit switches selectively activating one of a number of pins to serve as a stop for the positioning block. Again, no positive means is provided to lock the block into place once set. The instant invention merely provides one single magnetic reed switch instead of multiple limit switches.

The instant invention overcomes these multiple deficiencies of the prior art by providing a lumber and veneer jointer including an incrementally adjustable top hold-down roller assembly which collaborates with an improved conveyor belt assumbly for guiding a panel through the machine, an automatically actuated and positively engagable incrementally adjustable cutter carriage assembly for absolute precise trimming of the longitudinal side edges of a lumber of veneer strip, and additionally provides a mechanism for applying glue simultaneously to the finished longitudinal edges of the lumber or veneer strip.

SUMMARY OF THE INVENTION

The invention comprises means for applying a layer of liquid adhesive to the edges of a lumber strip passing through a jointer, the jointer including means to simultaneously treat the side edges of a lumber strip through the jointer, the adhesive applying means including a pair of glue applicator mechanisms, each having a glue basin, a doctor roll with pump means to direct glue from the basin to the doctor roll, a free roller located adjacent the doctor roll for receiving glue therefrom and applying glue to the lumber strip edge, excess glue being directed to the basin for re-circulation. Spring means urge the glue applicator roll against the strip edge, and means are provided to adjust the distance between the doctor and applicator rolls, dependent upon the viscosity of the glue employed.

BRIEF DESCRIPTION OF THE DRAWINGS

Details of construction and operation according to preferred embodiments of the invention will become readily apparent by the reference to the following drawings wherein:

FIG. 4 is a partial sectional view taken along lines 4—4 of FIG. 1;

FIG. 5 is another sectional view taken along lines 5—5 of FIG. 3;

FIG. 6 is an enlarged, partial sectional view of one of the cutters and the carriage support therefor, and shows the positioning set works from an end view;

FIG. 7 is a sectional view taken along lines 7—7 of FIG. 6 and shows the positioning set works in elevation;

FIG. 8 is yet another sectional view of the positioning set works taken along lines 8—8 of FIG. 7;

FIG. 9 is a plane view of the control panel for the positioning set works assembly;

FIG. 14 is a view in perspective of one species of the novel conveyor chain and a portion of its track;

FIG. 15 is a view similar to FIG. 15 and illustrates another species of the novel conveyor chain; and FIG. 16 is a view similar to FIGS. 14 and 15 and showing yet another species of the novel conveyor chain of the invention.

BRIEF DESCRIPTION OF THE PREFERRED EMBODIMENTS OF THE INVENTION

Figure 1:
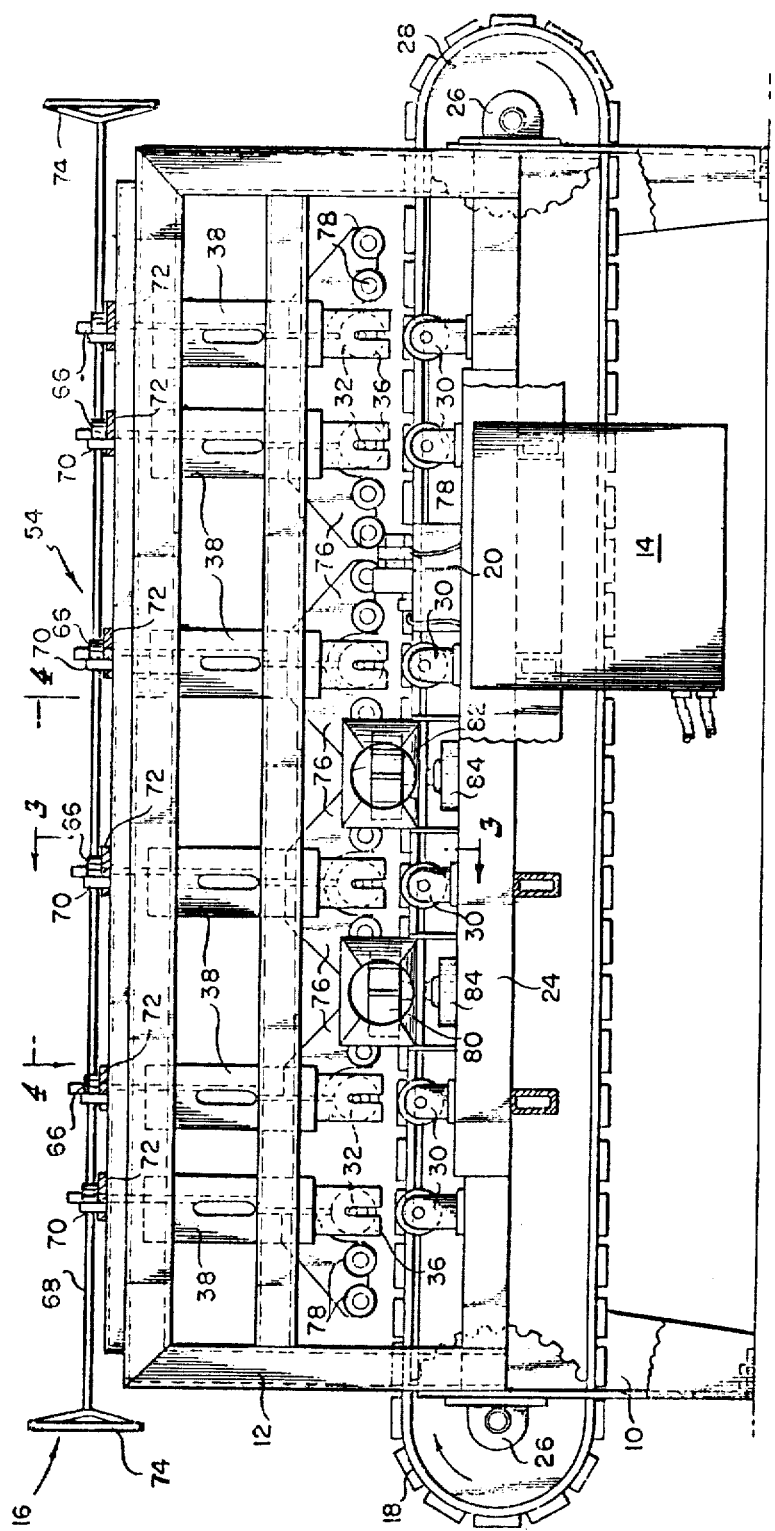
FIG. 1 is an elevational, side view of the complete invention.
Figure 2:
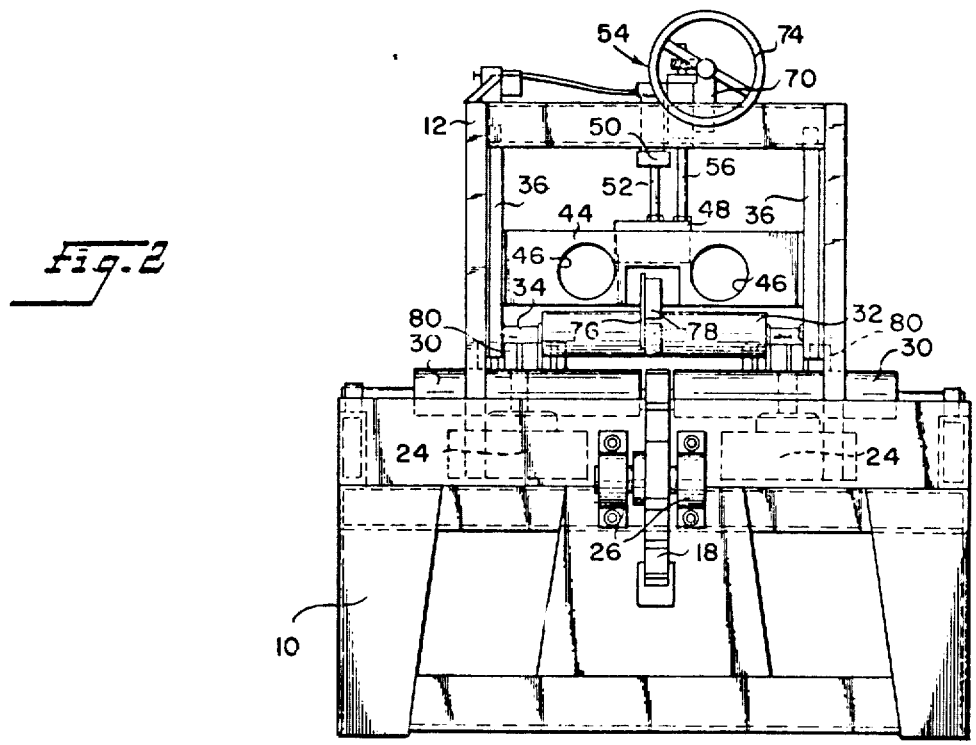
FIG. 2 is an elevational end view of the invention as depicted in FIG. 1.

Referring now to the drawings by reference character, and in particular to FIGS. 1 and 2 thereof, the entire combination is shown including a lower frame table 10 and upper frame works 12. Both frame works are preferably constructed of rectangular tubular metal although other materials might be used. With respect to FIG. 1, lumber or veneer strips to be treated are fed through the invention from the left hand to the right. On the outside frame table 10 is mounted the usual control panel 14 which houses control switches for the various electric drive motors of the invention, which will be described in greater detail later. The individual sub-combinations of the instant invention include the incrementally adjustable hold down roller assembly 16, the conveyor chain 18, the glue applicator 20, and the incrementally adjustable positioning set works assembly 22 (FIGS. 6, 7, and 8) which is employed to adjust cutter carriages 24, 24.

A pair of ball bearing pillow block assemblies 26, 26 are mounted one at each end of frame table 10 and support chain sprockets 28, 28 for conveyor chain 18 which comprises the single live drive for transporting lumber or veneer to be treated through the invention.

The drive means for sprockets 28, 28 may include the usual heavy duty drive motor having a chain drive (not shown). In addition to conveyor chain 18, a plurality of lower fixed freely rotating rollers 30 are provided on frame table 12, in mating pairs, one on each side of conveyor chain 18, to additionally support the veneer strip as it passes through the machine.

The top hold-down roller assembly 16 is best illustrated in FIGS. 1 through 5. A plurality of top hold-down rollers 32 each have a central support shaft 34 which is mounted for free rotation at each end in a vertically adjustable support plate 36, 36. Support plates 36, 36 are each mounted for vertical movement as shown in FIG. 5. Upper frame 12 includes a plurality of inner, fixed plates 38, one for each movable support plate 36. Two pairs of V-shaped wheels 40 are mounted at the top and bottom of fixed plate 38 and mate with V-rails 42, 42 which are formed on the exterior face of each support plate 36.

Each pair of movable plates 36 is additionally interconnected by a support beam 44, which may be bored at 46, 46 to conserve weight. A connective bracket 48 is formed or mounted centrally and on the upper portion of beam 44. Each beam 44, plates 36, and roller 32 is raised and lowered by means of the usual fluid pressure cylinder 50 and having a piston therein (not shown), and piston rod 52 extending downwardly therefrom, which is bolted to bracket 48.

Cylinder 50 may be either hydraulically or pneumatically operated, but the details and construction and operation thereof form no part of the instant invention. The up and down movement of the assembly just discussed is clearly shown in FIG. 3.

Figure 3:
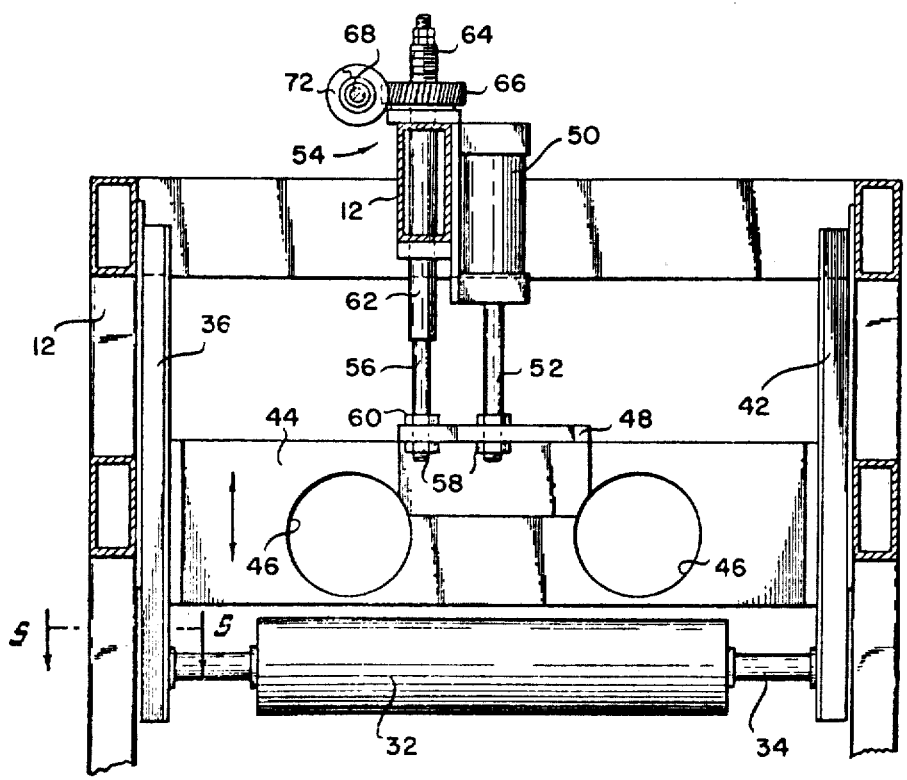
FIG. 3 is a sectional view taken along lines 3—3 of FIG. 1.

The downward limit of movement of each top hold down roller 32 is defined by an unique incrementally adjustable restraining system generally denoted by numeral 54. System 54 is connected to brackets 48 by a plurality of restraining bars 56 each of which includes a terminal restraining bolt 58. Bracket 48 is freely slidable with respect to each restraining bar 56 and includes a sleeve guide 60 for guiding the up-and-down movement of bracket 48 when fluid pressure cylinder 50 is actuated. Rotation of bar 56 is prevented by providing a squared portion 62 which is inserted through a squared slot (not shown) in a top frame member 12. The upper, terminal end of bar 56 comprises a portion 64 threaded through helical gear 66. As shown in FIG. 3, as helical gear 66 is rotated, restraining bar 56 is raised or lowered thereby defining the lower limit of travel of hold-down roller 32 when fluid pressure cylinder 50 is actuated.

Simultaneous adjustment of hold-down rollers 32 is accomplished by an adjusting shaft 68 rotatably secured on frame 12 by a plurality of support blocks 70. A plurality of worm gears 72 are located on control shaft 68, one for each helical gear 66. Finally, each end of control shaft 68 is provided with a hand wheel 74. It is clear that rotation of hand wheel 74 causes incremental adjustment of each roller 32, simultaneously to determine the downward limit of travel of each roller 32 when fluid pressure cylinder is actuated. Of course, the determined distance between mating pairs of rollers 30 and 32 (FIG. 1) depends upon the thickness of the lumber or veneer strip to be treated.

Added top pressure on the panel as it passes through the machine may be provided by additional hold-down brackets 76, extending one on each side of each support beam 44, and including pairs of additional pressure wheels 78, 78. As can be seen in FIG. 1, such construction assures constant pressure on the veneer or lumber strip as it is carried through the machine by chain 18.

FIGS. 4, 6, 7 and 8, depict the novel positioning set works mechanism for one of the cutter carriages 24, 24. FIG. 4, which shown a fragmentary top view of the invention, illustrates cutter carriages 24, 24, each having a rough finish hog cutter 80 and a smooth finish cutter head 82. Each cutter 80, 82 is provided with individual power means such as an electric motor 84.

Primary movement of each cutter carriages 24, 24, inwardly and outwardly with respect to the center line of the machine, which is defined by the plane of rotation of conveyor chain 18, is accomplished by a simple reverse thread shaft, threaded through one of the carriages 24, 24 and driven by power means such as an electric motor (not shown). This primary drive means is common in the art, and is clearly indicated in FIG. 5 of the U.S. Pat. No. 2,664,927 issued to A. F. Pierce. The invention in this case is the precise incremental adjustment means which is indicated in FIGS. 6, 7 and 8. Since there are two carriages, there are two threaded drive shafts (not shown), one for each carriage, and two positioning set works mechanisms 22, one for each carriage 24, 24. For the sake of simplicity, only one such works 22 is shown in detail in FIGS. 6, 7, and 8.

FIG. 6 indicates this arrangement in cross section, showing a cutter carriage 24 slidably mounted above lower frame table 10, by means of antifriction surfaces 86. Sectional view FIG. 7 again shows this construction, carriage 24 being movable inwardly towards the center line of the machine or in a left hand direction in the sense of FIG. 7, and being movable outwardly from the center line of the machine in a right hand direction in the sense of FIG. 7. As explained above, an ordinary reverse thread shaft is employed as a primary mover of carriage 24 inwardly and outwardly of the center line of the machine. If desired, a common gear and rack drive may be used instead of a reverse thread shaft (not shown). The construction indicated by FIG. 7 relates to the fine incremental adjustment for the cutter carriage, preparatory to and after such primary movement.

One set works 22 comprises a wedge bar 88, slidably movable along frame table 10. Movement of wedge bar 88 is controlled by a series of in-line, fluid pressure cylinders including a primary, fixed cylinder 90, having a ½ inch stroke, a pair of secondary cylinders 92, 93, having a one-quarter inch stroke and a one-eighth stroke respectively, and a pair of tertiary cylinders 94, 95, having a one-sixteenth and one-thirty secondth inch stroke respectively. The movement of these cylinders is controlled from a panel 96, indicated in FIG. 9. The l inch button shown thereon controls fixed cylinder 90. As pointed out above, there are two set works 22, one of which is not shown. Therefore, the one inch button also controls a corresponding ½ inch stroke fixed cylinder on the other set works, so that total movement, with respect to the longitudinal centerline of the invention, is additive, or one inch. Similarly, depression of the ½ inch button on panel 96 will activate mating pairs of ¼ inch stroke cylinders, one of which is shown in FIG. 7 and designated by numeral 92. Obviously, the same structure and operation also holds true for the ¼ inch button and cylinder 93, and the ⅛ inch button and cylinder 94, and the one-sixteenth inch button and cylinder 95.

As shown in FIG. 7, slidable wedge bar 88 includes a series of magnetic solenoid coils 98, each of which is keyed to its odd inch button on control panel 96. There is one odd inch control button 100 on panel 96 for each solenoid coil 98. For example, the nineteen inch control button 100 on panel 96 is keyed to magnetic solenoid coil 98a on wedge bar 88. Thus, fine adjustment of the carriage is regulated by the row of control buttons 102 which activate cylinders 90, 92, 93, 94, and 95, while extended movement of carriage 24 is controlled through the 3 inch to 25 inch control buttons 100.

Referring to FIGS. 6 and 8, a control strip 104 depends downwardly from carriage 24 and carries therein a single magnetic reed switch 106. Inwardly of strip 104 is a fluid pressure control cylinder 108, pivotally mounted on carriage 24, and having a piston rod 110 extending therefrom which is secured to an indexing control bracket 112. Pivotally connected to the lower distal end of bracket 112 is a pivoting indexing wedge bar 114, which is itself pivotally suspended from carriage 24 at 116 by a support 118. The head of bar 114 is shaped to mate selectively one of a series of wedge inserts 120 formed along the lower length of slidable wedge bar 88 (FIG. 7).

Viewing FIGS. 4 and 6 through 9, the operation of set works 22 may now be explained. Electrical circuitry for accomplishing the operation to be described will be discussed in detail later. By way of example, we will assume that a distance of twenty and five-sixteenths inches is to be set between cutter heads 80, 82 and 80, 82 (FIG. 4). First, the "On" button on control panel 96 is pushed to close a standard master control circuit. Secondly, it is assumed that carriages 24, 24 are closer together than 20 and 5/16 inches, therefore the "Out" button on control panel 96 will be depressed in order to determine the proper polarity to the electric drive motor for carriages 24, 24 so that when it is activated, the carriages 24, 24 will move away from each other. Next, slidable wedge bar 88 is set to a proper position. This is done by first breaking down the 20 and 5/16 inch distance into its proper components to match the control panel 96 of the invention. In other words, 20 and 5/16 inches equals 19 inches plus 1 inch plus ¼ inch plus 1/16 inch. This incremental adjustment of slidable wedge bar 88 is accomplished by depressing the 1 inch button 102, which activates cylinders 90, 90, the ¼ inch button 102 which activates cylinders 93, 93 and the 1/16 inch button 102 which activates cylinders 95, 95. Once this is completed, the 19 inch button 100 is depressed which causes the electric drive motor for carriages 24, 24 to be activated (not shown) and also energizes magnetic solenoid coil 98a which is keyed to the 19 inch to button 100. As soon as magnetic reed switch 106 comes behind activated solenoid 98a, switch 106 is activated and, through electrical circuitry, causes the primary drive motor to shut down and stop movement of carriages 24, 24. Immediately thereafter, cylinder 108 is activated to draw the head of pivoting indexing wedge bar 114 into its mating wedge slot 120 on slidable wedge bar 88. (FIG. 7) The movement of pivoting bar 114 into one of the slots 120 will cause final, incremental adjustment of saw carriages 24, 24 to within a few thousands of an inch. In this manner, a highly accurate pre-determined distance may be set between the pairs of cutting heads located on saw carriages 24, 24.

Figure 13:
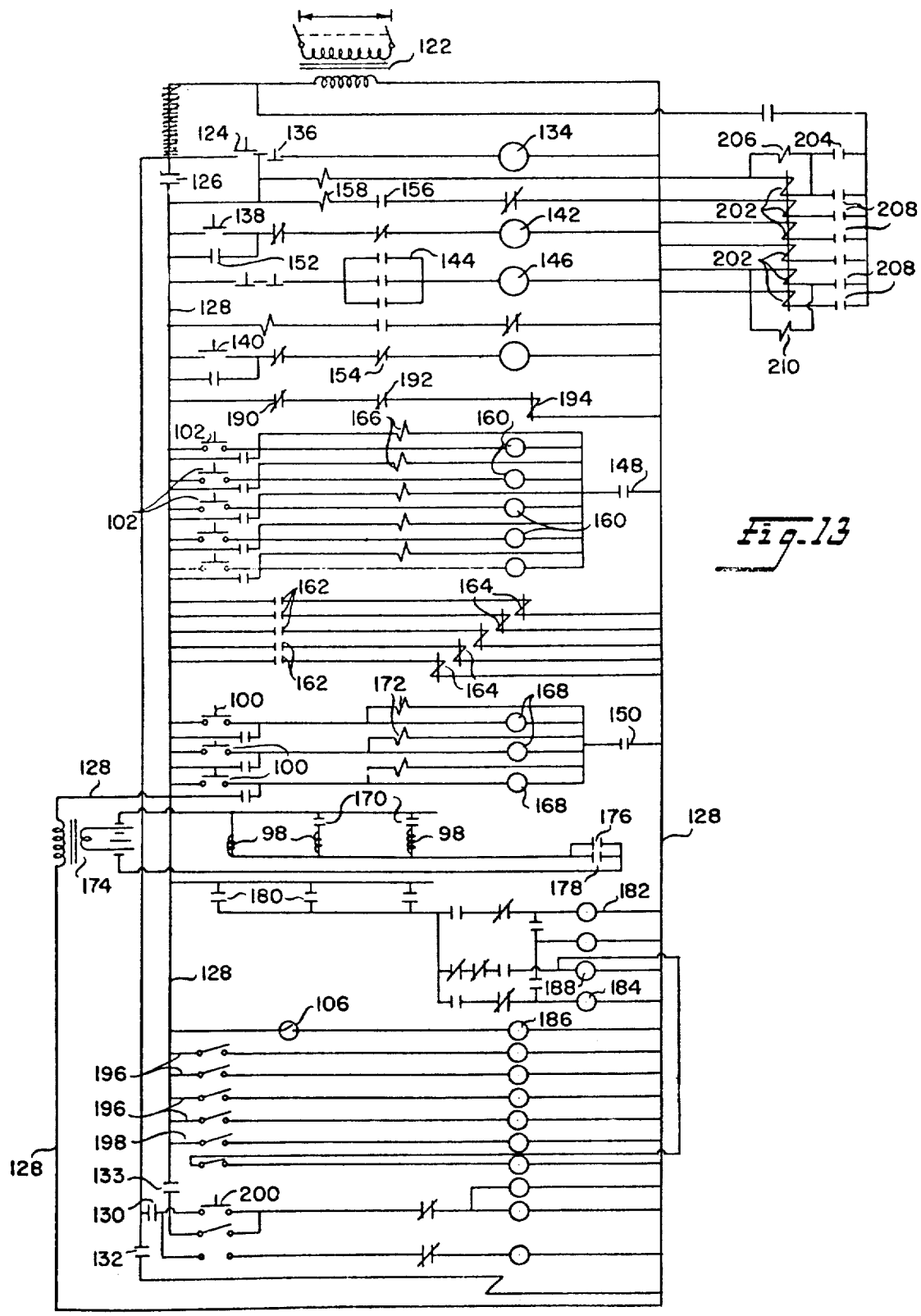
FIG. 13 is a schematic diagram of the electrical circuitry of the invention.

Turning now to FIG. 13, the electrical control circuitry for the above described operation will now be discussed. The circuitry shown in FIG. 13 is directed to only one of the set works 22. Obviously that portion of the circuitry shown in FIG. 13 directed to movement of the set works 22 would be duplicated for the other set works 22; for simplicity and clarity, only one circuit is shown. Power to the circuitry is provided through a standard transformer 122. The "On" button of control panel 96 (FIG. 9) is indicated by numeral 124 in FIG. 13 and, when depressed, serves to activate control relay 134 thus closing the entire circuit 128 through control contacts 126, 130, 132 and 133. The entire circuit will remain activated until off button 136 is depressed. Whether the carriages 24, 24 move inwardly or outwardly with respect to each other is determined by an "In" control button 138 or an "Out" control button 140. These controls are also shown on control panel 96 in FIG. 9. When push button 138 is depressed, "In" control relay 142 is activated; one contact 144 of relay 142 causes activation of a master relay 146. Master relay 146 is connected in turn to activate fractional inch cylinders control relay contacts 148 and odd inch control relay contact 150. Once button 138 is depressed, holding relay contact 152 is activated to keep the circuit closed during operation. At the same time, a normally closed relay contact 154 in the "Out" circuit is opened by depression of button 138 to prevent the "Out" system from being activated while the "In" system is employed, and another relay contact 156 is actuated from relay 146 to light a pilot light 158 so as to give visual indication of the attitude of the system. The circuitry control from "Out" button 140 is similar to that of the "In" system just discussed.

Once fractional cylinder control relay contact 148 is actuated, one or several of buttons 102 may be depressed to actuate one of several relays 160 each of which is keyed to an appropriate relay contact 162 which in turn causes one or several of fluid pressure valves 164 to open which finally causes one or several of cylinders 90, 92, 93, 94, and 95 to be activated. Each fractional cylinder relay system also includes the pilot light 166 for visual inspection of the operation.

Once fractional inch adjustment has been completed, one of several buttons 100 may be depressed to complete positioning of carriage tables 24, 24. For the sake of simplicity, only three of such circuits are indicated in FIG. 13. Each button 100 controls a relay 168, one terminal of which is connected through relay contacts 170 of electromagnets 98. Again, each circuit for relay 168 has a corresponding pilot light 172 for visual inspection. Of course, the first and last electromagnets 98 in the series are continually activated to prevent carriages 24, 24 from being moved beyond their inner or outer limits of adjustment. Step-down voltage power is provided for electromagnets 98 through a secondary transformer 174 from circuit 128. Additionally, the circuitry for electromagnets 98 is controlled by relay contact 176, which is connected to the circuitry control by push button 138, or by relay contact 178, which is connected to the circuitry operable by depression of push button 140. Depression of one of the buttons 100 will also cause an appropriate relay contact 180 to close, which in turn will start the carriage motor (not shown) to move carriages 24, 24 inwardly through circuit 180 to, or outwardly through circuit 184. The activation of circuit 182 or 184 depends on whether button 138 or 140 has been depressed.

Once the carriage motor starts, carriages 24, 24 continue to move until magnetic reed switch 106 enters the vicinity of one of the actuated electromagnets 98. The closing of reed switch 106 actuates a stop relay 186 which in turn activates carriage motor brake relay 188. Such deactivation of the system also causes another "In", normally closed relay contact 190 or "Out" normally closed relay contact 192 to open, thereby deactivating wedge cylinder control 194 which causes control cylinder 108 to retract thereby drawing pivoting wedge bar 114 into its proper position as explained above.

The remainder of the circuitry indicated by FIG. 13 includes motor switches 196 for the individual motors 84 for hog cutters 80 and finish cutters 82, and switch 198 for the carriage motor. Additionally, a forward drive switch 200 is provided for the drive motor (not shown) for conveyor chain 18.

The upper right hand corner of the FIG. 13 indicates the electric circuitry for fluid pressure cylinders 50 which are employed to move top rollers 32 downwardly to a hold down position. FIG. 1 indicates a total of six top rollers 32; six electric valve switches 202 are indicated in FIG. 13, one for each cylinder 50 above roller 32. All six switches 202 may be actuated simultaneously by closing a foot switch 204. A pilot light 206 is provided to indicate this operation. Alternatively, each roller 32 may have a limit switch 208 located thereby which will be contacted by the veneer or lumber strip as it passes through the machine. The limit switch may be located so as to be deflected by the veneer or lumber strip so as to selectively depress each roller 32 as the strip passes therebeneath. Of course, when the strip leaves the vicinity of one limit switch 208, the individual valve switch 202 would be deactivated, thereby raising roller 32. Again, one or several pilot lights 210 may be provided to indicate this operation visually.

Figure 10:
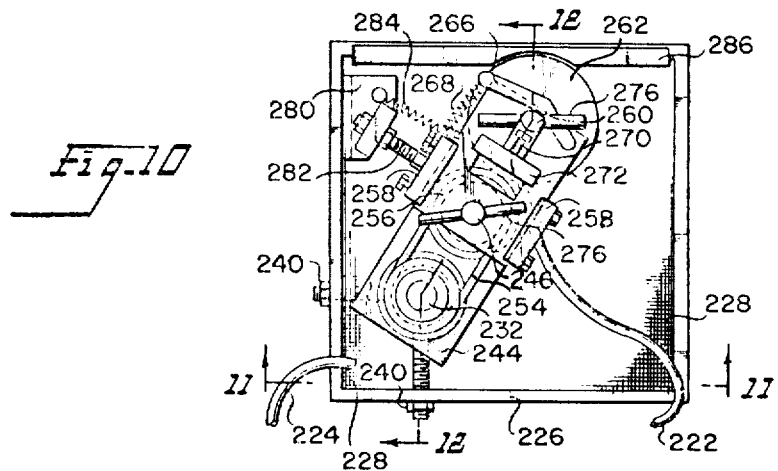
FIG. 10 is a top, plan view of the glue applicator of the invention.
Figure 11:
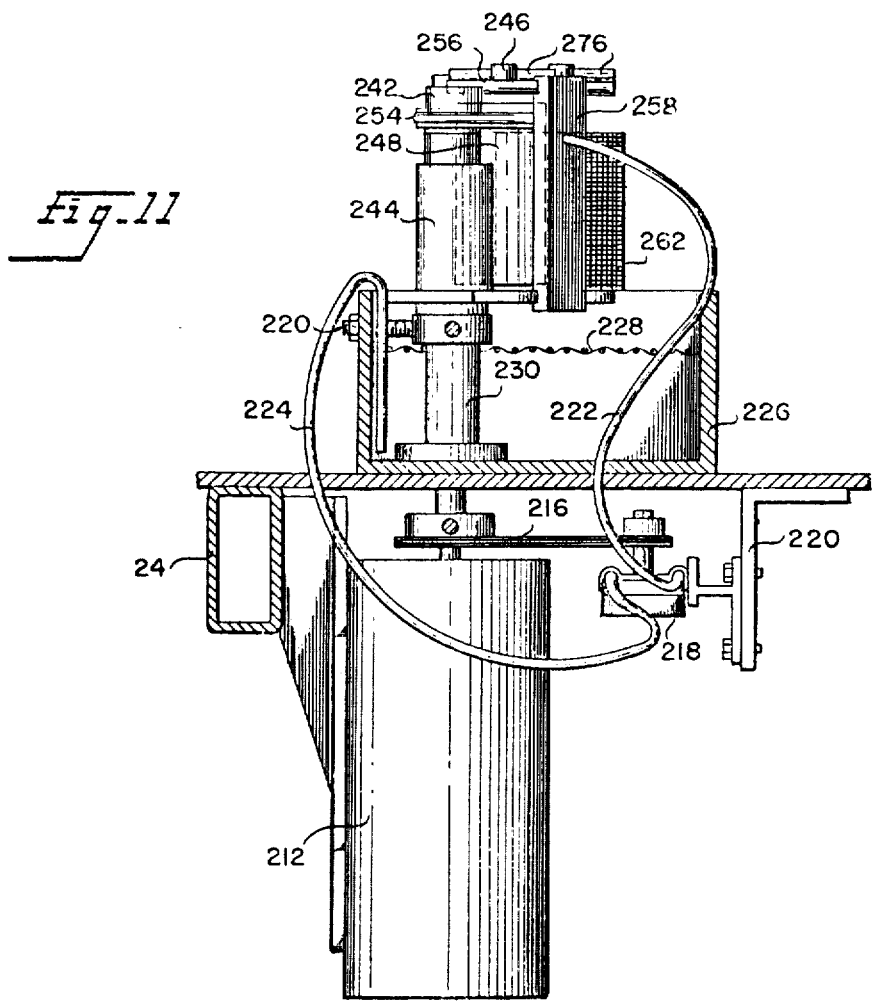
FIG. 11 is a sectional view taken along lines 11—11 of FIG. 10 and illustrates the glue applicator in elevation.
Figure 12:
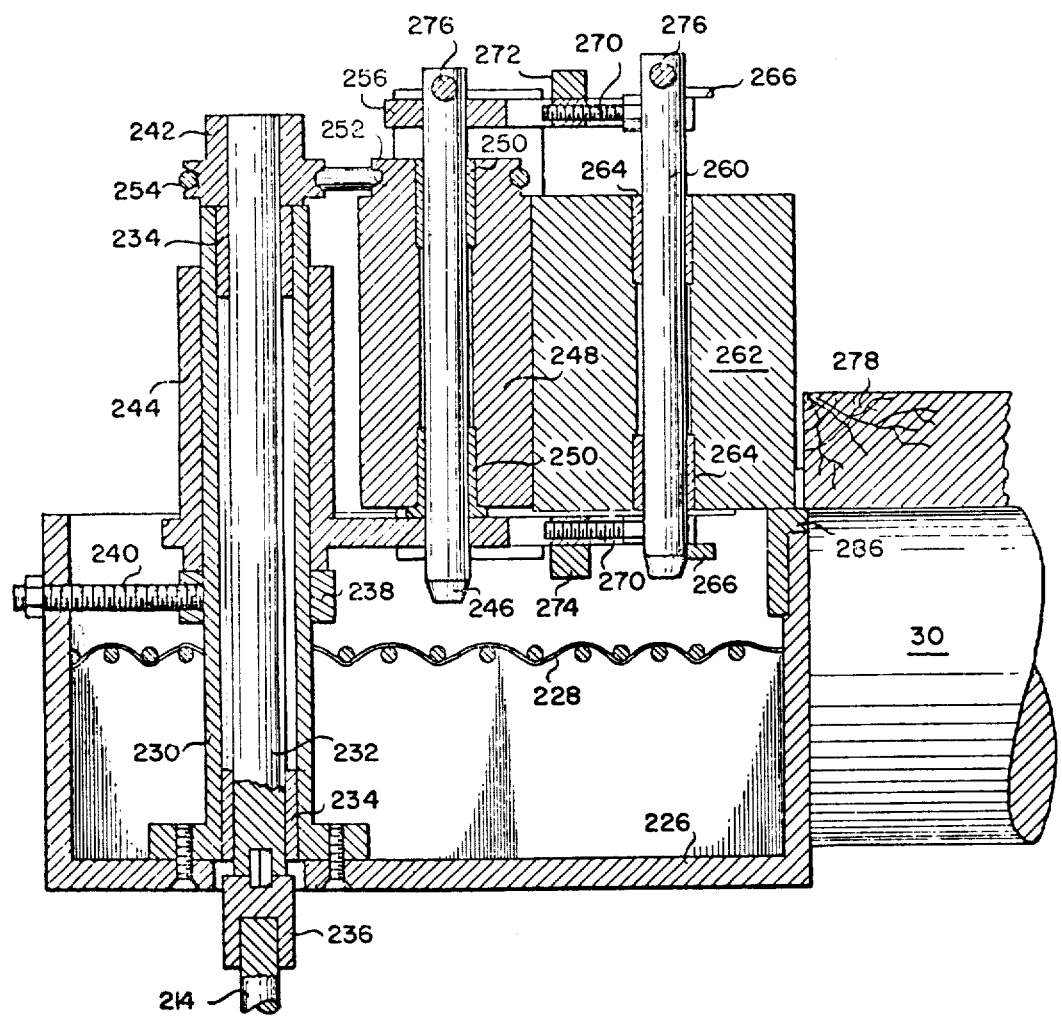
FIG. 12 is a sectional view of the glue applicator, taken along lines 12—12 of FIG. 10.

FIGS. 10, 11 and 12 indicate the novel glue applicator 20, of which there are two, one carried by each saw carriage 24, 24, forwardly of cutters 80 and 82 which are adapted to apply a thin strip of glue to the finished longitudinal edges of the lumber or veneer strip prior to ejection of the strip from the invention. Suspended beneath carriage 24 is a drive motor 212 having a drive shaft 214 powering a sprocket and chain drive assembly 216. Assembly 216 drives a centrifugal glue pump 218 which is mounted on a bracket 220 suspended from saw carriage 24. Pump 218 has the usual feed line 222 and return, or vacuum line 224 extending therefrom.

A glue bin 226 for holding the glue supply is secured on saw carriage 24 and may include a guard screen 228 for preventing contamination of the glue supply. A cylindrical stanchion 230 is mounted in bin 226, concentrically above drive shaft 214 and has a secondary drive shaft 232 therein, rotatably secured by bearings 234, 234 and powered by drive shafts 214 through a coupling member 236. Security of stanchion 230 in bin 226 is assured by a locking collar 238 rigidly attached to the side walls of glue bin 226 by bolts 240, 240. A pulley sheave 242 is secured to the upper, free distal end of secondary drive shaft 232. A sleeve bracket 244 is located above locking collar 238, medially of stanchion 230 and supports a rigid axle 246 which has a glue doctor roll 248 rotatably mounted thereon by means of bearings 250, 250. Doctor roll 248 is positively driven from pulley sheave 242 by means of a secondary pulley sheave 252, formed on the upper end of doctor roll 248, and a drive belt 254. Rigid support for axle 246 is provided at the upper end thereof by a plate 256 supported by legs 258, 258 which are in turn mounted on sleeve bracket 244. Feed line 222 extends through the upper end of one vertical leg 258 in the vicinity of the upper end of glue doctor roll 248 to apply glue thereto. Plates 256 and sleeve bracket 244 also support an outboard axle 260 on which a glue applicator roll 262 is freely rotatably mounted by bearings 264, 264. Of course, glue from feed line 222 is transferred first to doctor roll 248, and then to glue applicator roll 262. The glue applicator roll 262 may be grooved as shown in FIG. 11, the spacing between grooves being determined by the amount and type of glue to be applied to the finished edge of the lumber or veneer strip. At this point, it is understood that rolls 248 and 262, together with axles 246 and 260 as well as support plate 256 and sleeve bracket 244 are rotatable about cylindrical stanchion 230 by reason of the loose fit of sleeve bracket 244 with respect to cylindrical stanchion 230.

Glue applicator roll 262 is outwardly adjustable with respect to doctor roll 248 dependent upon the type of glue used by means of a U-shaped restraining arm 266, pivotally mounted at its stem ends to plate 256 and sleeve bracket 244. Arm 266 bears against the upper and lower ends of axle 260 and is held thereagainst by means of a coil spring 268 attached to one vertical leg 258. Axle 260 bears against a pair of fine adjustment screws 270, 270, one threaded through leg 272 of plate 256, and the other threaded through bracket 274 of sleeve bracket 244. A pair of restraining pins 276, 276 are provided, one for axle 260 and one for axle 246, to retain the axles in position. Angular adjustment of rolls 262 and 248 with respect to the direction of feed of a lumber or veneer strip 278 (FIG. 12) is indicated by FIG. 10. A bracket 280 threadably receives an adjusting screw 282 there through which bears against one vertical leg 258 which is restrained in movement away from screw 282 by a coil spring 284. Thus, as the strip strikes glue applicator roll 262, it is pivoted away slightly by the strip, the pivot point being the access of secondary drive shaft 232 but retained there against by means of coil springs 284. As the strip passes roll 262, it is retained in 90 degree alignment therewith by a guide shoe 286 (FIG. 12) which is mounted along the top lateral edge of glue bin 226.

FIGS. 14, 15 and 16 illustrate three species of the novel conveyor chain 18 of the invention. A bed or track 288 is mounted centrally over the machine and extends throughout the length thereof to support conveyor chain 18 at it carries the lumber or veneer strip between the rollers of the machine. In the species indicated by FIG. 14, the supportive link of the chain comprises a reverse, generally U-shaped member 290 having its lower, longitudinal edges 292 inwardly converging to mate with internal doubled sides 294 of conveyor track bed 288. This construction permits conveyor chain 18 to find a perfectly central location with respect to bed 288. A pad 296 of rubber, or other suitable material, is mounted on top of link 290 to contact and support the lower face of a veneer or lumber strip as it passes through the invention and prevents marring of the strip while providing friction contact between the strip and link 290. Each link 290 is connected to its successive link by a pair of connective links 298, 298. In this species, link 290 is formed or cast as an integral piece of material.

In the species indicated by FIG. 15, the individual chain link 290 comprises two side legs 300, 300 and a top plate member 302. Again, a protective friction pad 296 is mounted on top of plate 302.

In the species indicated by FIG. 16, track bed 288 is rectangular in cross section as is chain link 304, which is similar to link 290 but without having double outer edges. Of course, chain link 304 may be formed of three pieces of material as is the species of FIG. 15. Finally, bed 288 may include a liner 306 of anti-friction material.

It is readily apparent from the foregoing that we have invented a new and highly useful machine in the art of lumber and veneer jointing, and therefore, we are not to be limited to the precise embodiments hereinbefore discussed, except as may be deemed to be within the scope of the following claims.

We claim:

1. A jointer comprising means for simultaneously treating the side edges of a strip, means for transporting said strip through the jointer, means for applying a layer of liquid adhesive to said side edges as the strip passes thereby and further comprising:
   a. a bin for a supply of liquid adhesive;
   b. a power source, located beneath the bin and having a drive shaft extending upwardly through the bin;
   c. a drive shaft sleeve about the drive shaft;
   d. a rotatable doctor roll having an axle supported from the drive shaft sleeve;
   e. pump means for circulating liquid adhesive to the top of the doctor roll;
   f. a rotatable edge applicator roll having an axle located adjacent the doctor roll for receiving adhesive therefrom and applying it to a strip edge as it passes thereby, said drive shaft sleeve (c) including a sleeve bracket, freely rotatable with respect thereto, for mounting said rotatable doctor and adhesive applicator rolls, said sleeve bracket including
   g. spring means urging said bracket supported doctor and adhesive rolls into the path of travel of a strip passing through the jointer;
   h. means for adjusting the distance between said applicator and doctor rolls, dependent upon the viscosity of liquid adhesive employed, said means (h) for adjusting the distance between said applicator and doctor rolls comprising:
   i. means defining a pair of slots in the sleeve bracket for receiving the distal ends of the applicator axle;
   j. a pair of restraining arms, one for each slot, bearing against the applicator axle ends;
   k. spring means urging the restraining arms against the applicator axle ends;
   l. a pair of micrometer adjusting screws, threadably received in the slots interiorally of the axle ends, for adjusting the distance between the applicator axle and the doctor roll axle, said spring means (g) urging said bracket supported doctor and adhesive rolls into the path of travel of a strip passing through the jointer further including
   m. a bin supported bracket adjacent said spring means urging the rolls into the strip path of travel;

n. an adjusting screw, threaded through the bin supported bracket and bearing against the sleeve bracket, said adjusting screw (n) being operable to rotate said sleeve bracket with respect to said drive shaft sleeve and thereby vary, laterally, the distance between the applicator roll and the path of travel of a strip through the jointer, said liquid adhesive bin (a) including a guide shoe bearing against and located beneath the rotatable edge applicator roll to retain said applicator roll in 90° alignment with respect to a strip passing through the jointer, and a guard screen located above the level of liquid adhesive therein to prevent contamination thereof.

* * * * *